United States Patent
Hu et al.

(10) Patent No.: US 12,158,557 B2
(45) Date of Patent: Dec. 3, 2024

(54) METHOD AND DEVICE FOR PREDICTING DEEP GEOTHERMAL FIELD BASED ON TEMPERATURE, PRESSURE AND RESISTIVITY COUPLING CONSTRAINT

(71) Applicant: CHINA UNIVERSITY OF GEOSCIENCES, WUHAN, Wuhan (CN)

(72) Inventors: Xiangyun Hu, Wuhan (CN); Guoshu Huang, Wuhan (CN); Jianchao Cai, Wuhan (CN); Jian Yang, Wuhan (CN); Huolin Ma, Wuhan (CN); Wenlong Zhou, Wuhan (CN)

(73) Assignee: CHINA UNIVERSITY OF GEOSCIENCES, WUHAN, Hubei (CN)

( * ) Notice: Subject to any disclaimer, the term of this patent is extended or adjusted under 35 U.S.C. 154(b) by 0 days.

(21) Appl. No.: 18/032,343

(22) PCT Filed: Nov. 10, 2022

(86) PCT No.: PCT/CN2022/131137
§ 371 (c)(1),
(2) Date: Apr. 18, 2023

(87) PCT Pub. No.: WO2023/202047
PCT Pub. Date: Oct. 26, 2023

(65) Prior Publication Data
US 2024/0264332 A1    Aug. 8, 2024

(30) Foreign Application Priority Data
Apr. 22, 2022 (CN) .......................... 202210428404.5

(51) Int. Cl.
*G01V 11/00* (2006.01)
*E21B 49/00* (2006.01)

(52) U.S. Cl.
CPC ............ *G01V 11/002* (2013.01); *E21B 49/00* (2013.01)

(58) Field of Classification Search
CPC .............................. G01V 11/002; E21B 49/00
See application file for complete search history.

(56) References Cited

U.S. PATENT DOCUMENTS

2021/0264262 A1    8/2021    Colombo et al.

FOREIGN PATENT DOCUMENTS

| CN | 106401574 A | * | 2/2017 | ............. E21B 49/00 |
| CN | 109931054 A |   | 6/2019 | |

(Continued)

OTHER PUBLICATIONS

Guoshu Huang et al., Deep Temperature-Field Prediction Utilizing the Temperature-Pressure-Coupled Resistivity Model: A Case Study in the Xiong'an New Area, China, Jan. 1, 2024, IEEE Transactions on Geoscience and Remote Sensing, vol. 62, 5902216, pp. 1-16 (Year: 2024).*

(Continued)

*Primary Examiner* — Mi'schita' Henson
(74) *Attorney, Agent, or Firm* — Bayramoglu Law Offices LLC

(57) ABSTRACT

A method for predicting a deep geothermal field based on a temperature, pressure, and resistivity coupling constraint includes: equally dividing logging resistivity-overburden pressure-temperature data of m boreholes in a study area into N formations on a depth basis, and normalizing resistivity in each formation; deducing an accurate relationship characterization between a normalized resistivity, a temperature and a pressure in different formations of different formations; inverting an electromagnetic data volume in the study area to obtain a resistivity distribution characteristic, equally dividing an inverted resistivity into M formations, (Continued)

and normalizing the inverted resistivity into a normalized inverted resistivity; inverting a density distribution based on gravity observation data, and converting the density distribution into an overburden pressure; and calculating a distribution characteristic of a deep underground temperature field based on the accurate relationship characterization in different formations, the normalized inverted resistivity, and the overburden pressure.

8 Claims, 5 Drawing Sheets

(56) References Cited

FOREIGN PATENT DOCUMENTS

| | | | | |
|---|---|---|---|---|
| CN | 110566171 A | | 12/2019 | |
| CN | 110727031 B | * | 4/2021 | ............. G01V 1/303 |
| CN | 112861065 A | * | 5/2021 | ............. G06F 17/11 |
| CN | 113176618 A | | 7/2021 | |
| CN | 113625364 A | | 11/2021 | |
| CN | 113901681 A | | 1/2022 | |
| CN | 114895365 A | * | 8/2022 | ............... G01V 3/38 |

OTHER PUBLICATIONS

E. Cayeux et al., Analysis of the Sources of Uncertainty in Geopressure Estimation While Drilling, Oct. 16-18, 2023, 2023 SPE Annual Technical Conference and Exhibition, Society of Petroleum Engineers DOI 10.2118/214962-MS, SPE-214962-MS, pp. 1-25 (Year: 2023).*
Machine translation of CN 110727031B (Year: 2021).*
Machine translation of CN 112861065A (Year: 2021).*
Maryadi et al., Subsurface temperature estimation in a geothermal field based on audio-frequency magnetotelluric data, Jul. 8, 2021, Exploration Geophysics, 53(3), 275-288 (Abstract Only). https://doi.org/10.1080/08123985.2021.1949945 (Year: 2021).*

* cited by examiner

METHOD AND DEVICE FOR PREDICTING DEEP GEOTHERMAL FIELD BASED ON TEMPERATURE, PRESSURE AND RESISTIVITY COUPLING CONSTRAINT

CROSS REFERENCE TO THE RELATED APPLICATIONS

This application is the national phase entry of International Application No. PCT/CN2022/131137, filed on Nov. 10, 2022, which is based upon and claims priority to Chinese Patent Application No. 202210428404.5, filed on Apr. 22, 2022, the entire contents of which are incorporated herein by reference.

TECHNICAL FIELD

The present disclosure relates to the field of geothermal field prediction, and in particular, to a method and device for predicting a deep geothermal field based on a temperature, pressure, and resistivity coupling constraint.

BACKGROUND

The internal temperature of the earth is one of its key characteristics. Scholars' understanding of the internal temperature of the earth determines their ability to study basic earth science and apply geothermal energy. Therefore, it is extremely important to accurately estimate the temperature distribution characteristics of the underground space to the maximum extent.

At present, there are mainly two ways to obtain the internal temperature of the earth: direct measurement and indirect calculation. In direct measurement, the temperature characteristics in the depth direction are obtained through borehole logging and the regional temperature field is obtained based on the spatial interpolation of borehole logging temperature with irregular distribution. However, the high cost of borehole temperature logging and the small amount of interpolation on the borehole logging temperature often led to considerable errors, especially in areas with complex geological structures. In indirect calculation, the geothermal field is predicted through geochemical or geophysical methods. The geochemical method uses a geochemical geothermometer to predict the temperature field, that is, the temperature characteristics are deduced from the collected geochemical isotope or gas composition data, etc. The indirect geothermometer can predict the temperature distribution range of the geothermal reservoir, but it cannot estimate regional temperature distribution or match the predicted temperature with the depth. The geophysical method uses a geothermometer based on geophysical exploration. The geothermal field in the study area is predicted by constructing a heat transfer model or is deduced based on a coupling relationship between geophysical parameters (such as resistivity and wave velocity) and temperature, as well as geophysical exploration. The establishment of the temperature model needs to accurately define the thermophysical parameters of the underground space and model boundary conditions. These values and prior constraints can only be roughly estimated, resulting in large errors in the predicted temperature field. At present, the prediction of the temperature field by geophysical parameters (such as resistivity) is mainly based on a pure empirical formula, whose effectiveness is assumed not to change with the spatial location. That is, all parameters in the empirical formula are assumed to be fixed values under any geological environment and depth, which is obviously unreasonable. Therefore, the prior temperature estimation methods cannot accurately predict the temperature at the undrilled depth, effectively provide the temperature distribution in the inter-well space, and accurately predict the distribution characteristics of regional deep geothermal field.

SUMMARY

The present disclosure aims to solve the problems existing in the prior art, that is, the temperature model established for the prediction of the underground temperature field, especially the prediction of deep space temperature, has large errors, and the prediction of the geothermal field based on a pure empirical formula is not reasonable. The present disclosure provides a method and device for predicting a deep geothermal field based on a temperature-pressure-resistivity coupling constraint. The present disclosure deduces an accurate relationship characterization between a normalized resistivity, a temperature, and a pressure in different formations (at different depths) in an underground space through a borehole logging resistivity-overburden pressure-temperature data combination in a study area or an adjacent area. The present disclosure carries out fine structure inversion of electromagnetic detection data and gravity field data to obtain resistivity and density distribution characteristics, normalizes the resistivity, and converts the density into an overburden pressure. Finally, the present disclosure combines the accurate relationship characterization between the normalized resistivity, the temperature, and the pressure at different depths in the study area, as well as the normalized resistivity and the overburden pressure, to realize the prediction of a deep underground temperature field.

In order to achieve the above objective, a first aspect of the present disclosure proposes a method for predicting a deep geothermal field based on a temperature, pressure and resistivity coupling constraint, including the following steps:
  acquiring a logging resistivity-density-temperature data combination of m boreholes located in a study area or an adjacent area; converting the density in the logging resistivity-density-temperature data combination into an overburden pressure, and constructing a logging resistivity-overburden pressure-temperature data combination; equally dividing the logging resistivity-overburden pressure-temperature data combination into N formations on a depth basis; and normalizing the logging resistivity in each formation of each well to obtain normalized logging resistivity-overburden pressure-temperature data sets of different formations;
  constructing a constraint equation $F_{RTP}$ of a normalized resistivity-overburden pressure-temperature coupling relationship according to a plurality of the logging resistivity-overlying pressure-temperature data sets; and calculating a pressure control coefficient $A(i)$, a temperature control coefficient $B(i)$, and a constant coefficient $C(i)$ in the constraint equation $F_{RTP}$ of the normalized resistivity-overburden pressure-temperature coupling relationship in different formations of different well locations, where i denotes an i-th formation;
  combining values of the pressure control coefficient $A(i)$, the temperature control coefficient $B(i)$, and the constant coefficient $C(i)$ in different formations of different well locations with depths of the corresponding formations to construct a target data set; and performing regression analysis on the target data set to obtain change relationships of the pressure control coefficient A(i), the temperature control coefficient B(i), and the constant coefficient C(i) with a depth z, which are denoted as A(z), B(z), and C(z), respectively;

performing three-dimensional (3D) fine inversion of an electromagnetic data volume in the study area to obtain a distribution characteristic of an inverted resistivity $R_{inv}(x,y,z)$ at each point P(x,y,z) in an underground space; equally dividing a profile of the inverted resistivity into M formations on a depth basis, and normalizing the inverted resistivity in each formation to obtain a normalized inverted resistivity $R_{Ninv}(x,y,z)$ at different points in different formations; and inverting a 3D density distribution $\rho_g(x,y,z)$ based on gravity observation data, and converting the density distribution into an overburden pressure distribution Pre(x,y,z), where x denotes a horizontal distance of the point in the underground space, y denotes a longitudinal distance of the point in the underground space, and z denotes a vertical depth of the point in the underground space; and obtaining an accurate relationship characterization between the normalized inverted resistivity and the temperature at different points P(x,y,z) in different formations in the deep formation of the study area, according to the pressure control coefficient A(i), the temperature control coefficient B(i), and the constant coefficient C(i) in the constraint equation $F_{RTP}(i)$ of the normalized resistivity-overburden pressure-temperature coupling relationship at different depths underground, the change relationships of the pressure control coefficient A(i), the temperature control coefficient B(i), and the constant coefficient C(i) with the depth z, namely A(z), B(z), and C(z), and the overburden pressure distribution Pre(x,y,z); and predicting a distribution characteristic of a deep geothermal field T(x,y,z) in the study area according to the accurate relationship characterization and the normalized inverted resistivity $R_{Ninv}(x,y,z)$.

Preferably, the converting the density in the logging resistivity-density-temperature data combination into an overburden pressure includes calculating the overburden pressure as follows:

$$P_{over}(h) = \begin{cases} 0, & h = 0 \\ \sum_{i=1}^{N_p} \rho_{log}(h) g \Delta h, & h > 0 \end{cases}$$

where, $P_{over}(h)$ denotes the overburden pressure at different depths; $\rho_{log}$ denotes a formation logging density; g denotes an acceleration of gravity; h denotes a formation depth; $\Delta h$ denotes an interval of logging data; and $N_P$ denotes a number of logging data points from a depth h to the surface.

Preferably, the equally dividing the logging resistivity-overburden pressure-temperature data combination into N formations on a depth basis; and normalizing the logging resistivity in each formation of each well to obtain normalized logging resistivity-overburden pressure-temperature data sets of different formations includes normalizing the logging resistivity as follows:

$$R_{Norm}(i, j) = \frac{R_{log}(i, j)}{\max[R_{log}(i)]}$$

where, each equal formation is expressed as $H_{range}(i)$:

$$H_{Lmin} + D_{Lseg} \times (i - 1) \le H_{range}(i) \le H_{Lmin} + D_{Lseg} \times i$$

$$N = \text{round}\left(\frac{H_{Lmax} - H_{Lmin}}{D_{Lseg}}\right)$$

where, $R_{Norm}(i,j)$ denotes the normalized logging resistivity at a j-th measuring point in the i-th formation of each well, i=1, 2, 3 ... N; $R_{log}(i,j)$ denotes the logging resistivity at the j-th measuring point in the i-th formation of each well; $R_{log}(i)$ denotes a logging resistivity data set of all measuring points in the i-th formation of each well; $\max[R_{log}(i)]$ denotes a maximum value of the logging resistivity data set of all the measuring points in the i-th formation of each well; $H_{Lmax}$ denotes a maximum logging depth of each well; $H_{Lmin}$ denotes a minimum logging depth of each well; $D_{Lseg}$ denotes a thickness of each equal formation; and $$\text{round}\left(\frac{H_{Lmax} - H_{Lmin}}{D_{Lseg}}\right)$$

denotes rounding of $$\frac{H_{Lmax} - H_{Lmin}}{D_{Lseg}}$$

to an integer.

Preferably, the constraint equation $F_{RTP}(i)$ of the normalized resistivity-overburden pressure-temperature coupling relationship is expressed as follows:

$$F_{RTP}(i) = F(R_{Norm}(i), T_i, P_{iover}(i))$$

a coupling relationship among $R_{Norm}(i)$, $T_i$, and $P_{iover}$ is expressed as follows:

$$R_{Norm}(i) = A(i)\log\left(\frac{P_{iover}(i)}{P_0}\right) + B(i)\log(T_i) + C(i)$$

where, $F_{RTP}(i)$ denotes the constraint equation of the normalized resistivity-overburden pressure-temperature coupling relationship in the i-th formation, which is a function of $R_{Norm}(i)$, $T_i$, and $P_{iover}(i)$, and is expressed as $F(R_{Norm}(i), T_i, P_{iover}(i))$; $R_{Norm}(i)$ denotes a normalized resistivity data set of all measuring points in the i-th formation of each well; $P_0$ denotes a normal pressure; $P_{over}(i)$ denotes an overburden pressure data set of all the measuring points in the i-th formation of each well; and $T_i$ denotes a logging temperature data set of all the measuring points in the i-th formation of each well.

Preferably, the normalizing the inverted resistivity in each formation to obtain a normalized inverted resistivity $R_{Ninv}(x,y,z)$ at different points in different formations includes normalizing the inverted resistivity as follows:

$$R_{Ninv}(k, x, y, z) = \frac{R_{inv}(k, x, y, z)}{\max[R_{inv}(k)]}$$

where, x denotes a horizontal distance of each point in the underground space; y denotes a longitudinal distance of each point in the underground space; z denotes a vertical depth of each point in the underground space; $R_{inv}(k, x,y,z)$ denotes an inverted resistivity $R_{inv}(x,y,z)$ data set in a k-th formation, k=1,2,3, ... M; max $[R_{inv}(k)]$ denotes a maximum value of the inverted resistivity $R_{inv}(x,y,z)$ in the k-th formation; and $R_{Ninv}(k, x,y,z)$ denotes a normalized inverted resistivity $R_{Niv}(x,y,z)$ data set in the k-th formation.

Preferably, the inverting a 3D density distribution $\rho_g(x,y,z)$ based on gravity observation data, and converting the density distribution into an overburden pressure distribution Pre(x,y,z) includes converting the density distribution into the overburden pressure distribution as follows:

$$P_{pre}(x, y, z) = \begin{cases} 0, & z = 0 \\ \sum_{p_i=1}^{p_i=N_p} \rho_g(x, y, z) g \Delta z_{inv}, & z > 0 \end{cases}$$

where, $P_{pre}(x,y,z)$ denotes the overburden pressure distribution calculated based on the inversion of the 3D density distribution $\rho_g(x,y,z)$; $\rho_g(x,y,z)$ denotes the 3D density distribution inverted based on the gravity observation data; g denotes an acceleration of gravity; $\Delta z_{inv}$ denotes an interval of gravity inversion data along the depth z; and $N_P$ denotes a number of density inversion data points from the depth z to the surface.

Preferably, the predicting a distribution characteristic of a deep geothermal field T(x,y,z) in the study area according to the accurate relationship characterization and the normalized inverted resistivity $R_{Ninv}(x,y,z)$ includes predicting the distribution characteristic of the deep geothermal field in the study area as follows:

$$T(x, y, z) = \exp\left[R_{Ninv}(x,y,z) - C_{cal} - A_{cal} \log\left(\frac{P_{pre}(i)}{P_0}\right)\right]/B_{cal}$$

$$A_{cal} = \begin{cases} A(i), z \in H_{range}(i), & H_{Lmin} \le z \le H_{Lmax} \\ A(z = h), z > H_{Lmax} \text{ or } z < H_{Lmin} \end{cases}$$

$$B_{cal} = \begin{cases} B(i), z \in H_{range}(i), & H_{Lmin} \le z \le H_{Lmax} \\ B(z = h), z > H_{Lmax} \text{ or } z < H_{Lmin} \end{cases}$$

$$C_{cal} = \begin{cases} C(i), z \in H_{range}(i), & H_{Lmin} \le z \le H_{Lmax} \\ C(z = h), z > H_{Lmax} \text{ or } z < H_{Lmin} \end{cases}$$

where, T(x,y,z) denotes a predicted temperature at each point; $A_{cal}$ denotes a pressure control coefficient used in calculating a deep temperature; $B_{cal}$ denotes a temperature control coefficient used in calculating the deep temperature; and $C_{cal}$ denotes a constant coefficient used in calculating the deep temperature.

A second aspect of the present disclosure proposes a device for predicting a deep geothermal field based on a temperature, pressure and resistivity coupling constraint, including the following modules:

a data set acquisition module configured to: acquire a logging resistivity-density-temperature data combination of m boreholes located in a study area or an adjacent area; convert the density in the logging resistivity-density-temperature data combination into an overburden pressure, and construct a logging resistivity-overburden pressure-temperature data combination; equally divide the logging resistivity-overburden pressure-temperature data combination into N formations on a depth basis; and normalize the logging resistivity in each formation of each well to obtain normalized logging resistivity-overburden pressure-temperature data sets of different formations;

a constraint equation construction and coefficient calculation module configured to: construct a constraint equation $F_{RTP}$ of a normalized resistivity-overburden pressure-temperature coupling relationship according to a plurality of the logging resistivity-overlying pressure-temperature data sets; and calculate a pressure control coefficient A(i), a temperature control coefficient B(i), and a constant coefficient C(i) in the constraint equation $F_{RTP}$ of the normalized resistivity-overburden pressure-temperature coupling relationship in different formations of different well locations, where i denotes an i-th formation;

a coefficient regression analysis module configured to: combine values of the pressure control coefficient A(i), the temperature control coefficient B(i), and the constant coefficient C(i) in different formations of different well locations with depths of the corresponding formations to construct a target data set; perform regression analysis on the target data set to obtain change relationships of the pressure control coefficient A(i), the temperature control coefficient B(i), and the constant coefficient C(i) with a depth z, which are denoted as A(z), B(z), and C(z), respectively;

an inverted resistivity normalization module configured to: perform 3D fine inversion of an electromagnetic data volume in the study area to obtain a distribution characteristic of an inverted resistivity $R_{inv}(x,y,z)$ at each point P(x,y,z) in an underground space; and equally divide a profile of the inverted resistivity into M formations on a depth basis, and normalize the inverted resistivity in each formation to obtain a normalized inverted resistivity $R_{Ninv}(x,y,z)$ at different points in different formations;

an overburden pressure conversion module configured to: invert a 3D density distribution $\rho_g(x,y,z)$ based on gravity observation data, and convert the density distribution into an overburden pressure distribution Pre (x,y,z), where x denotes a horizontal distance of the point in the underground space, y denotes a longitudinal distance of the point in the underground space, and z denotes a vertical depth of the point in the underground space; and a geothermal temperature field distribution prediction module configured to: obtain an accurate relationship characterization between the normalized inverted resistivity and the temperature at different points P(x,y,z) in different formations in the deep formation of the study area, according to the pressure control coefficient A(i), the temperature control coefficient B(i), and the constant coefficient C(i) in the constraint equation $F_{RTP}$ of the normalized resistivity-overburden pressure-temperature coupling relationship at different depths underground, the change relationships of the pressure control coefficient A(i), the temperature control coefficient B(i), and the constant coefficient C(i) with the depth z, namely A(z), B(z), and C(z), and the overburden pressure distribution Pre(x,y,z); and predict a distribution characteristic of a deep geothermal field T(x,y,z) in the study area according to the accurate relationship characterization and the normalized inverted resistivity $R_{Ninv}(x,y,z)$.

The technical solution of the present disclosure has the following beneficial effects. The present disclosure constructs the accurate relationship characterization between the normalized inverted resistivity and the temperature at different points of different formations underground in the study area based on an overburden pressure constraint. The present disclosure converts the macroscopic resistivity characteristic of the underground medium into an intuitive temperature field distribution according to the accurate relationship characterization, and the accuracy of the predicted value reaches 85.51%. The present disclosure features strong practicability, wide and deep prediction range, and is of great significance for geothermal resource evaluation, geothermal development temperature monitoring, etc.

DETAILED DESCRIPTION OF THE EMBODIMENTS

In order to make the objectives, technical solutions, and effects of the present disclosure clearer, the implementations of the present disclosure are described in more detail below with reference to the drawings.

Figure 1:
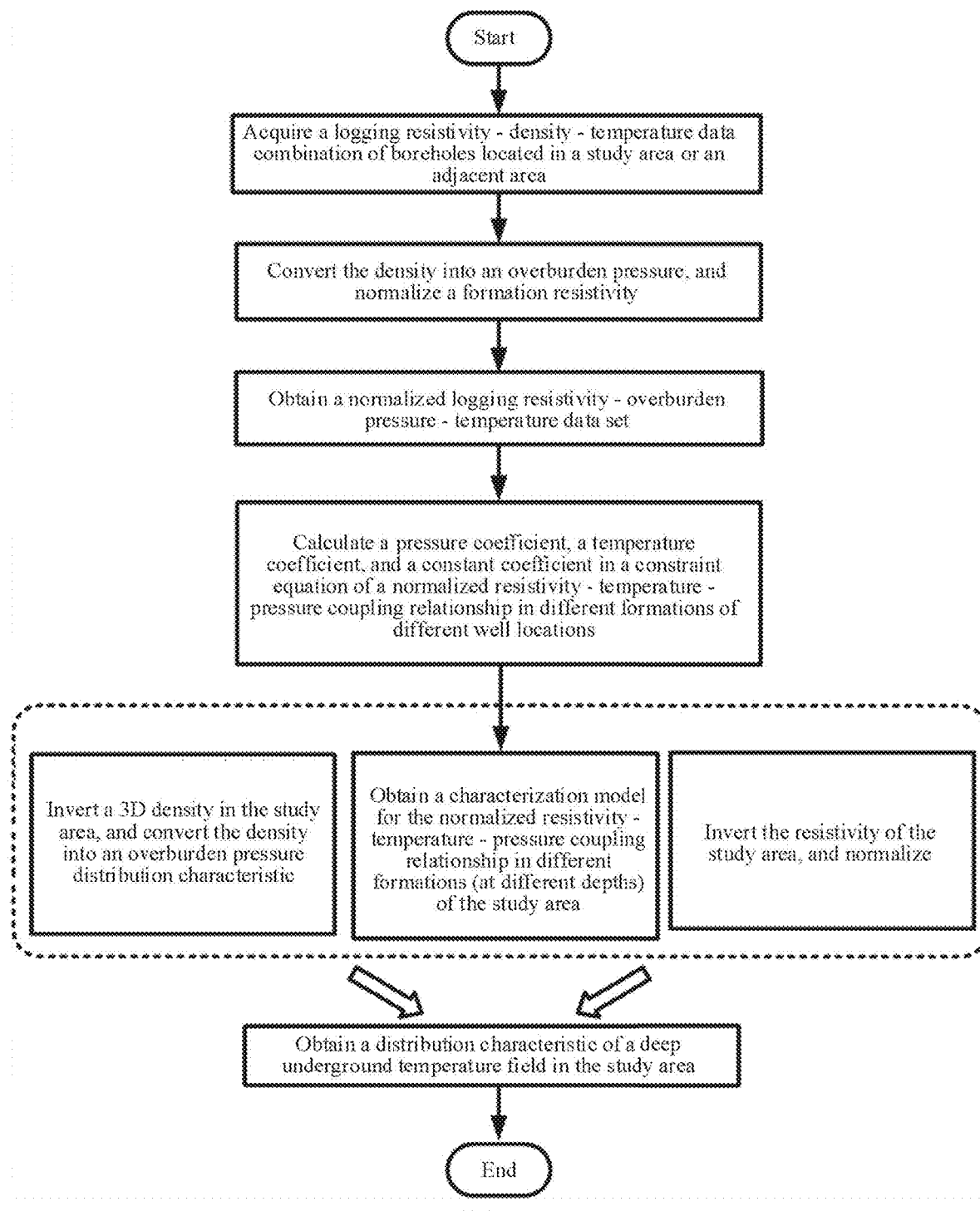
FIG. 1 is a flowchart of a method for predicting a deep geothermal field based on a temperature, pressure and resistivity coupling constraint according to the present disclosure.

Embodiment 1. Referring to FIG. 1, FIG. 1 is a flowchart of a method for predicting a deep geothermal field based on a temperature, pressure and resistivity coupling constraint. The method includes the following steps:

S1. A logging resistivity-density-temperature data combination of m boreholes located in a study area or an adjacent area is acquired. The density in the logging resistivity-density-temperature data combination is converted into an overburden pressure, and a logging resistivity-overburden pressure-temperature data combination is constructed. The logging resistivity-overburden pressure-temperature data combination is equally divided into N formations on a depth basis. The logging resistivity in each formation of each well is normalized to obtain normalized logging resistivity-overburden pressure-temperature data sets of different formations.

In this embodiment, step S1 is specifically as follows. According to a logging resistivity-density-temperature data combination of m=4 boreholes located in the study area or the adjacent area, the density of the m=4 boreholes is converted into the overburden pressure according to Eq. (1). The logging resistivity-overburden pressure-temperature data of the m=4 boreholes is equally divided into formations of $D_{Lseg}$=200 m, and the resistivity in each formation is normalized according to Eq. (2).

$$P_{over}(h) = \begin{cases} 0, & h = 0 \\ \left(\sum_{i=1}^{N_p} \rho_{log}(h) g \Delta h\right), & h > 0 \end{cases} \quad (1)$$

$$R_{Norm}(i, j) = \frac{R_{log}(i, j)}{\max[R_{log}(i)]} \quad (2)$$

Each equal formation is expressed as $H_{range}(i)$:

$$H_{Lmin} + D_{Lseg} \times (i - 1) \leq H_{range}(i) \leq H_{Lmin} + D_{Lseg} \times i \quad (3)$$

$$N = \text{round}\left(\frac{H_{Lmax} - H_{Lmin}}{D_{Lseg}}\right) \quad (4)$$

where, $P_{over}(h)$ denotes the overburden pressure at different depths; $\rho_{log}$ denotes a formation logging density; g denotes an acceleration of gravity; h denotes a formation depth; $\Delta h$ denotes an interval of logging data; $N_P$ denotes a number of logging data points from a depth h to the surface; $R_{Norm}(i,j)$ denotes the normalized logging resistivity at a j-th measuring point in the i-th formation of each well, i=1, 2, 3 . . . N; $R_{log}(i,j)$ denotes the logging resistivity at the j-th measuring point in the i-th formation of each well; $R_{log}(i)$ denotes a logging resistivity data set of all measuring points in the i-th formation of each well; max $[R_{log}(i)]$ denotes a maximum value of the logging resistivity data set of all the measuring points in the i-th formation of each well; $H_{Lmax}$ denotes a maximum logging depth of each well; $H_{Lmin}$ denotes a minimum logging depth of each well; $D_{Lseg}$ denotes a thickness of each equal formation; and $$\text{round}\left(\frac{H_{Lmax} - H_{Lmin}}{D_{Lseg}}\right)$$

denotes rounding of $$\frac{H_{Lmax} - H_{Lmin}}{D_{Lseg}}$$

to an integer.

S2. Pressure control coefficient A(i), temperature control coefficient B(i), and constant coefficient C(i) in the constraint equation $F_{RTP}$ of the normalized resistivity-overburden pressure-temperature coupling relationship in different formations of different well locations are calculated by multivariate regression according to the normalized logging resistivity-overburden pressure-temperature data set in step S1. The relationships of the pressure control coefficient, the temperature control coefficient, and the constant coefficient with a formation depth, namely A(z), B(z), and C(z), are acquired.

Figure 2:
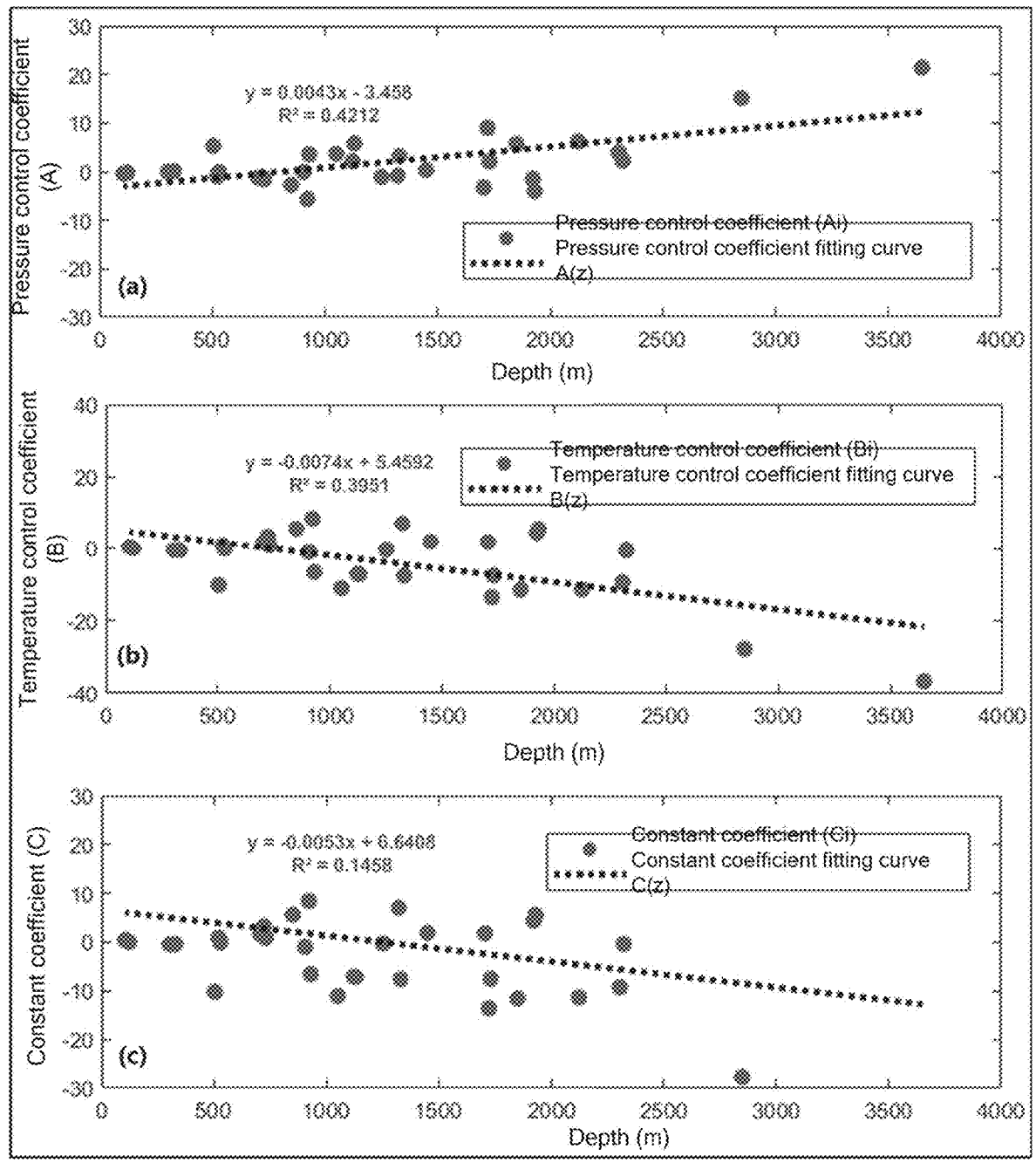
FIG. 2 shows changes of a pressure control coefficient A(i), a temperature control coefficient B(i), and a constant coefficient C(i) with a depth according to the present disclosure.

In this embodiment, step S2 is specifically as follows. Based on the normalized logging resistivity-overburden pressure-temperature data set in step S1, the constraint equation $F_{RTP}$ of the normalized resistivity-overburden pressure-temperature coupling relationship is constructed. The pressure control coefficient A(i), temperature control coefficient B(i), and constant coefficient C(i) in the constraint equation $F_{RTP}(i)$ of the normalized resistivity-overburden pressure-temperature coupling relationship in different formations of different well locations are calculated by multivariate regression. The pressure control coefficient A(i), the temperature control coefficient B(i), and the constant coefficient C(i) are combined with depths of the corresponding formations to construct a target data set. Regression analysis is performed on the target data set to obtain the change relationships of the pressure control coefficient, the temperature control coefficient, and the constant coefficient with the depth, which are denoted as A(h), B(h), and C(h), respectively (FIG. 2). The constraint equation $F_{RTP}(i)$ of the normalized resistivity-overburden pressure-temperature coupling relationship is expressed as follows:

$$F_{RTP}(i) = F(R_{Norm}(i), T_i, P_{iover}(i))$$

A coupling relationship among $R_{Norm}(i)$, $T_i$, and $P_{iover}$ is expressed as follows:

$$R_{Norm}(i) = A(i)\log\left(\frac{P_{over}(i)}{P_0}\right) + B(i)\log(T_i) + C(i)$$

where, $F_{RTP}(i)$ denotes the constraint equation of the normalized resistivity-overburden pressure-temperature coupling relationship in the i-th formation, which is a function of $R_{Norm}(i)$, $T_i$, and $P_{iover}(i)$, and is expressed as $F(R_{Norm}(i), T_i, P_{iover}(i))$; $R_{Norm}(i)$ denotes a normalized resistivity data set of all measuring points in the i-th formation of each well; $P_0$ denotes a normal pressure; $P_{over}(i)$ denotes an overburden pressure data set of all the measuring points in the i-th formation of each well; and $T_i$ denotes a logging temperature data set of all the measuring points in the i-th formation of each well.

S3. Three-dimensional (3D) fine inversion of an electromagnetic data volume in the study area is performed to obtain a distribution characteristic of an inverted resistivity $\rho_{inv}(x,y,z)$ at each point P(x,y,z) in an underground space, and the inverted resistivity is normalized to $R_{Ninv}(x,y,z)$, where x denotes a horizontal distance of the point in the underground space, y denotes a longitudinal distance of the point in the underground space, and z denotes a vertical depth of the point in the underground space.

Figure 3:
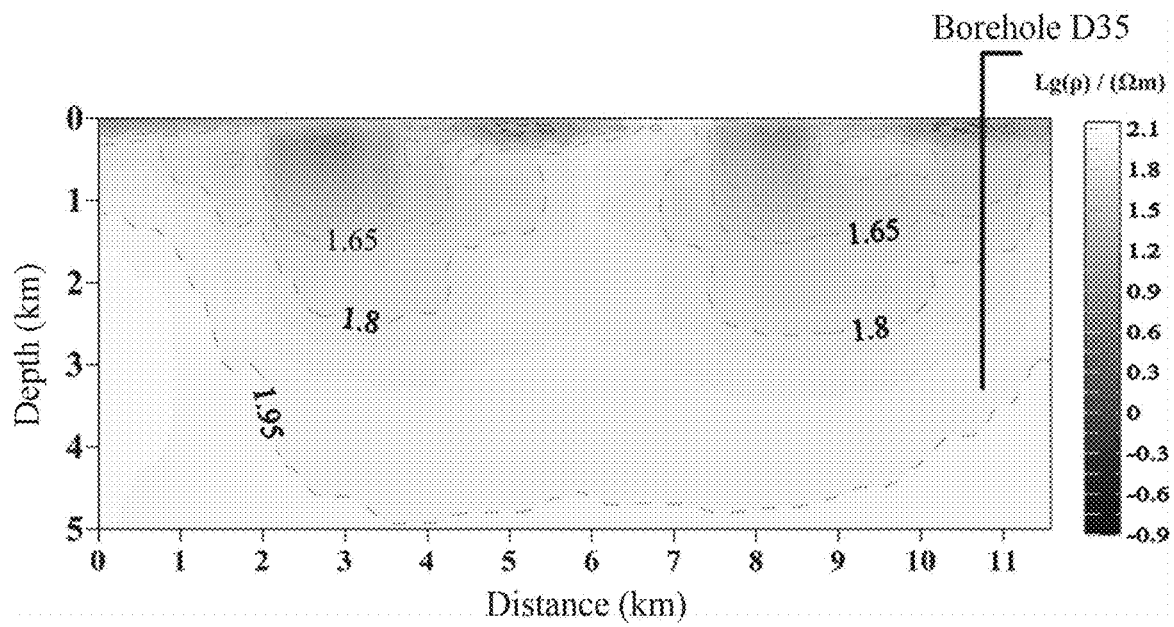
FIG. 3 shows an inverted resistivity profile of an underground space in a study area according to the present disclosure.

In this embodiment, step S3 specifically includes 3D fine inversion of an electromagnetic data volume in the study area is performed to obtain a distribution characteristic of an inverted resistivity $R_{inv}(x,y,z)$ at each point P(x,y,z) in the underground space. Referring to FIG. 3, the 3D inverted resistivity $R_{inv}(x,y,z)$ is sliced to obtain a resistivity profile corresponding to an electromagnetic survey line. The inverted resistivity profile is equally divided into M=54 formations, and the inverted resistivity in each formation is normalized according to Eq. (7) to obtain the normalized inverted resistivity $R_{Ninv}(x,y,z)$ at different points in different formations.

$$R_{Ninv}(k,x,y,z) = \frac{R_{inv}(k,x,y,z)}{\max[R_{inv}(k)]} \quad (7)$$

where, x denotes a horizontal distance of each point in the underground space; y denotes a longitudinal distance of each point in the underground space; z denotes a vertical depth of each point in the underground space; $R_{inv}(k, x,y,z)$ denotes an inverted resistivity Rim (x,y,z) data set in a k-th formation, k=1,2,3, . . . M; max $[R_{inv}(k)]$ denotes a maximum value of the inverted resistivity $R_{inv}(x,y,z)$ in the k-th formation; and $R_{Ninv}(k, x,y,z)$ denotes a normalized inverted resistivity $R_{Niv}(x,y,z)$ data set in the k-th formation.

S4. A 3D density distribution $\rho_g(x,y,z)$ is inverted based on gravity observation data and is converted into an overburden pressure distribution Pre(x,y,z).

Figure 4:
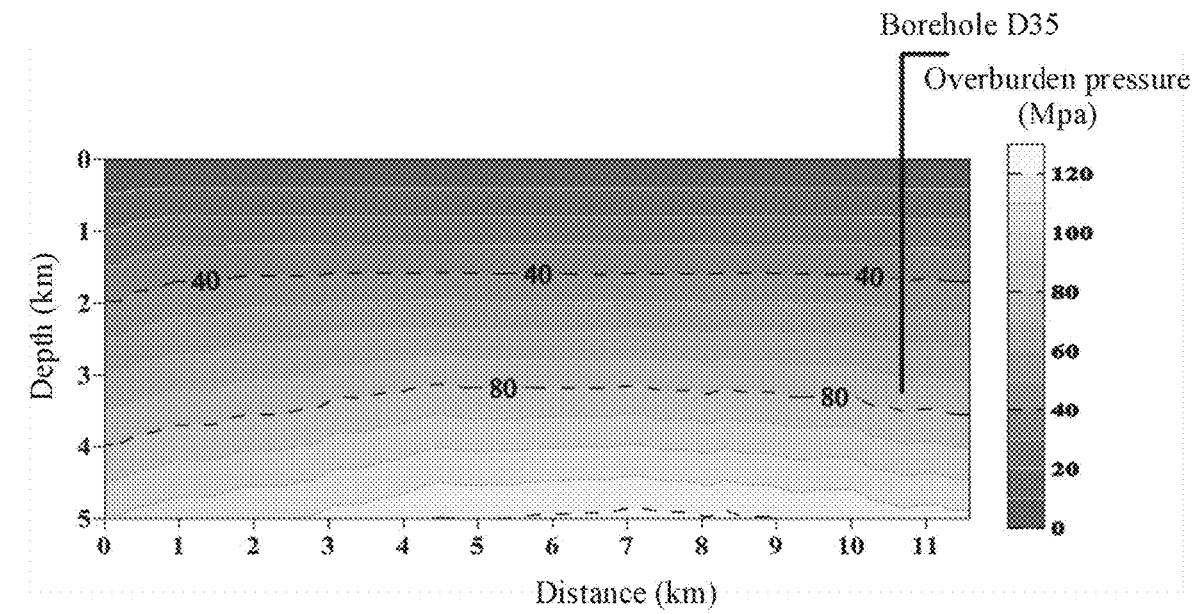
FIG. 4 shows an overburden pressure profile of the underground space in the study area according to the present disclosure.

In this embodiment, step S4 is specifically as follows. 3D fine inversion is performed on a gravity data volume in the study area to obtain a distribution characteristic of density $\rho_g(x,y,z)$ at each point P(x,y,z) in the underground space. The density inversion is converted into the overburden pressure $P_{pre}(x,y,z)$ distribution according to Eq. (8). Referring to FIG. 4, the 3D overburden pressure $P_{pre}(x,y,z)$ is sliced to obtain the overburden pressure distribution corresponding to the electromagnetic survey line in step S3.

$$P_{pre}(x, y, z) = \begin{cases} 0, z = 0 \\ \sum_{p_i=1}^{p_i=N_p} \rho_g(x, y, z) g \Delta z_{inv}, z > 0 \end{cases} \quad (8)$$

where, $P_{pre}(x,y,z)$ denotes the overburden pressure distribution calculated based on the inversion of the 3D density distribution $\rho_g(x,y,z)$; $\rho_g(x,y,z)$ denotes the 3D density distribution inverted based on the gravity observation data; g denotes an acceleration of gravity; $\Delta z_{inv}$ denotes an interval of gravity inversion data along the depth z; and $N_P$ denotes a number of density inversion data points from the depth z to the surface.

S5. A distribution characteristic of a deep geothermal field in the study area is predicted based on the constraint equation $F_{pTP}$ of the normalized resistivity-overburden pressure-temperature coupling relationship at different depths underground (in different formations), Pre(x,y,z), and $P_{Ninv}$ (x,y,z).

Figure 5:
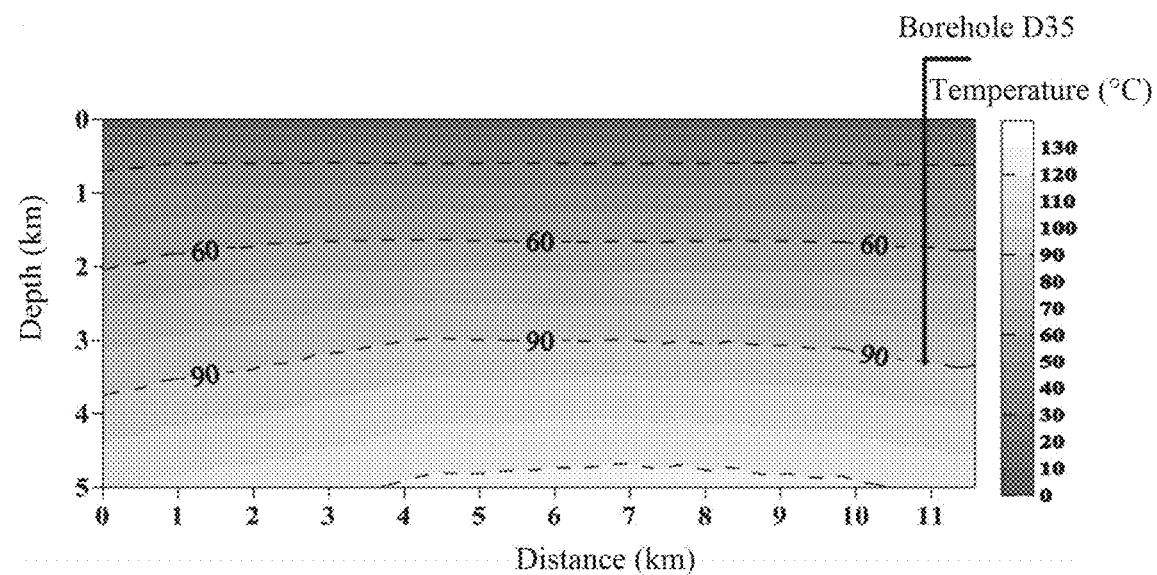
FIG. 5 shows a temperature field profile of the underground space in the study area according to the present disclosure.

In this embodiment, step S5 is specifically as follows. An accurate relationship characterization between the normalized inverted resistivity and the temperature at different points P(x,y,z) in the deep formation of the study area is obtained according to the pressure control coefficient A(i), the temperature control coefficient B(i), and the constant coefficient C(i) in the constraint equation $F_{pTP}$ of the normalized resistivity-overburden pressure-temperature coupling relationship in step S2, the change relationships of the pressure control coefficient A(i), the temperature control coefficient B(i), and the constant coefficient C(i) with the depth, namely A(z), B(z), and C(z), and the overburden pressure distribution $P_{pre}(x,y,z)$ in step S4. According to the accurate relationship characterization and the normalized inverted resistivity $R_{Ninv}(x,y,z)$ in step S3, the distribution characteristic of the geothermal field T(x,y,z) at each point P(x,y,z) in the underground space is calculated according to Eq. (9), formation by formation, and point by point. Referring to FIG. 5, the 3D geothermal field T(x,y,z) in the deep formation is sliced to obtain the distribution characteristic of the geothermal field corresponding to the electromagnetic survey line in step S3.

$$T(x, y, z) = \exp\left[R_{Ninv}(x,y,z) - C_{cal} - A_{cal}\log\left(\frac{P_{pre}(x,y,z)}{P_0}\right)\right]/B_{cal} \quad (9)$$

$$A_{cal} = \begin{cases} A(i), z \in H_{range}(i), H_{Lmin} \le z \le H_{Lmax} \\ A(z = h), z > H_{Lmax} \text{ or } z < H_{Lmin} \end{cases} \quad (10)$$

-continued $$B_{cal} = \begin{cases} B(i), z \in H_{range}(i), H_{Lmin} \le z \le H_{Lmax} \\ B(z = h), z > H_{Lmax} \text{ or } z < H_{Lmin} \end{cases} \quad (11)$$

$$C_{cal} = \begin{cases} C(i), z \in H_{range}(i), H_{Lmin} \le z \le H_{Lmax} \\ C(z = h), z > H_{Lmax} \text{ or } z < H_{Lmin} \end{cases} \quad (12)$$

where, $T(x,y,z)$ denotes a predicted temperature at each point; $A_{cal}$ denotes a pressure control coefficient used in calculating a deep temperature; $B_{cal}$ denotes a temperature control coefficient used in calculating the deep temperature; and $C_{cal}$ denotes a constant coefficient used in calculating the deep temperature.

Figure 6:
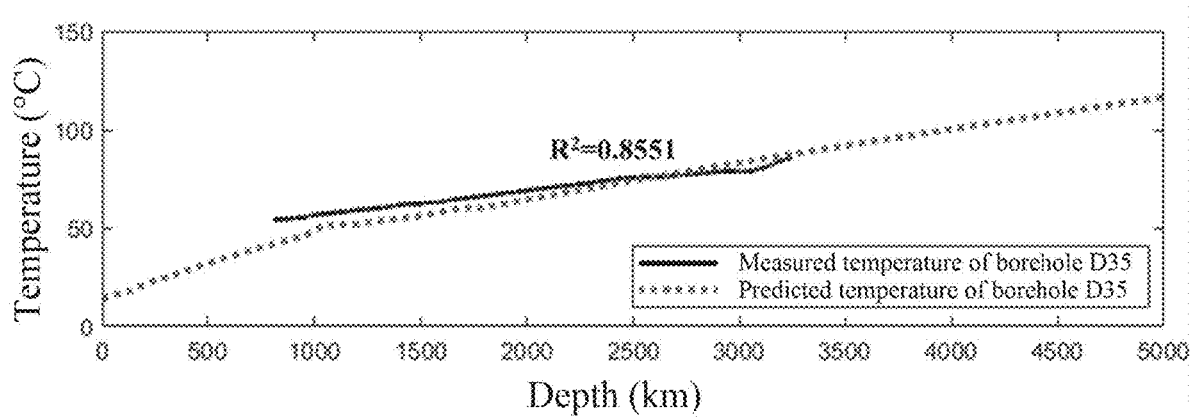
FIG. 6 shows a comparison between a predicted temperature and a measured temperature in the study area.

Referring to FIG. 6, FIG. 6 shows a comparison between a predicted temperature and a measured temperature in the study area. In this embodiment, a change curve of the temperature with the depth at the borehole temperature measuring point in the predicted temperature profile of the study area is extracted and compared with the actual logging temperature. The experimental results show that the goodness of fit between the predicted temperature of borehole D35, and the measured temperature thereof is $R^2=0.8551$. That is, in this embodiment, the prediction accuracy of temperature field is 85.51%, and the predicted temperature is in good agreement with the measured temperature.

Figure 7:
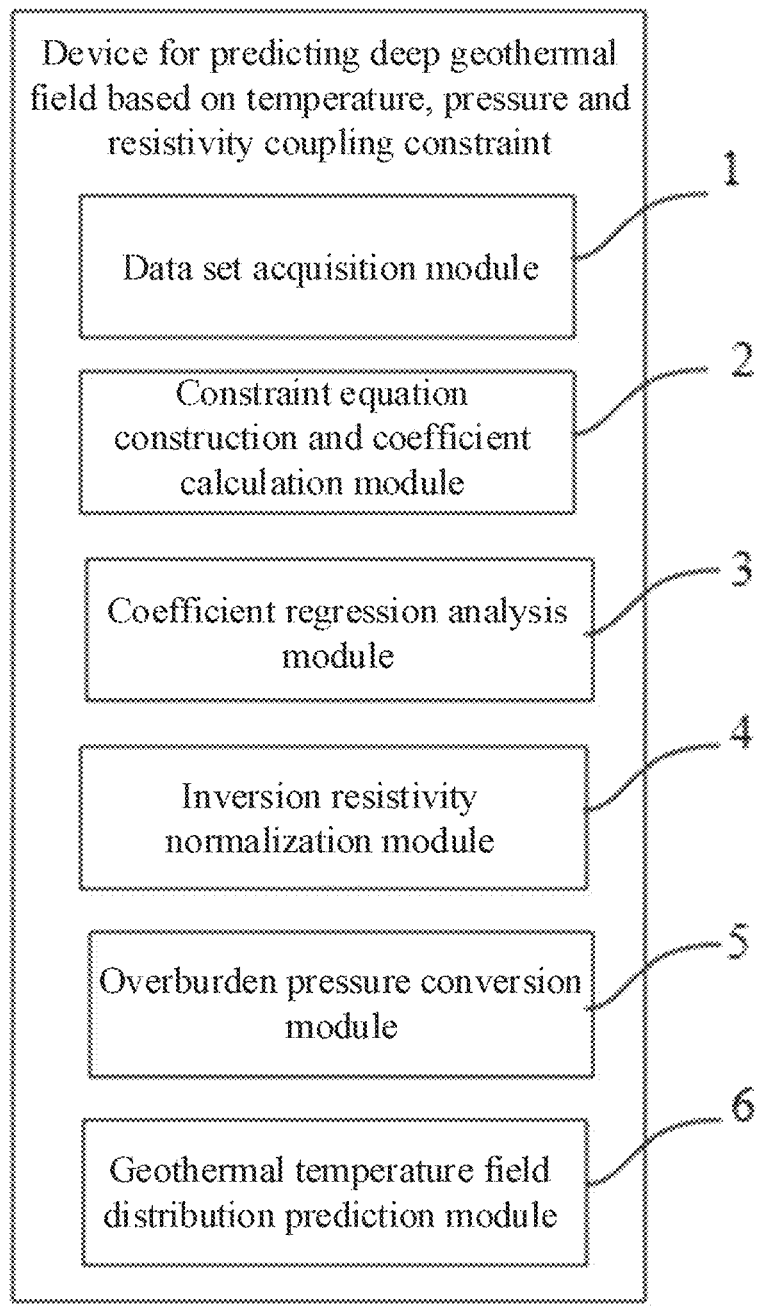
FIG. 7 is a structural diagram of a device for predicting a deep geothermal field based on a temperature, pressure and resistivity coupling constraint according to the present disclosure.

Embodiment 2. Referring to FIG. 7, this embodiment provides a device for predicting a deep geothermal field based on a temperature, pressure and resistivity coupling constraint. The device includes data set acquisition module 1, constraint equation construction and coefficient calculation module 2, coefficient regression analysis module 3, inverted resistivity normalization module 4, overburden pressure conversion module 5, geothermal temperature field distribution prediction module 6.

The data set acquisition module 1 is configured to acquire a logging resistivity-density-temperature data combination of m boreholes located in a study area or an adjacent area; convert the density in the logging resistivity-density-temperature data combination into an overburden pressure, and construct a logging resistivity-overburden pressure-temperature data combination; equally divide the logging resistivity-overburden pressure-temperature data combination into N formations on a depth basis; and normalize the logging resistivity in each formation of each well to obtain normalized logging resistivity-overburden pressure-temperature data sets of different formations.

The constraint equation construction and coefficient calculation module 2 is configured to construct a constraint equation $F_{RTP}$ of a normalized resistivity-overburden pressure-temperature coupling relationship according to a plurality of the logging resistivity-overlying pressure-temperature data sets; and calculate a pressure control coefficient $A(i)$, a temperature control coefficient $B(i)$, and a constant coefficient $C(i)$ in the constraint equation $F_{RTP}$ of the normalized resistivity-overburden pressure-temperature coupling relationship in different formations of different well locations, where i denotes an i-th formation;

The coefficient regression analysis module 3 is configured to combine values of the pressure control coefficient $A(i)$, the temperature control coefficient $B(i)$, and the constant coefficient $C(i)$ in different formations of different well locations with depths of the corresponding formations to construct a target data set; perform regression analysis on the target data set to obtain change relationships of the pressure control coefficient $A(i)$, the temperature control coefficient $B(i)$, and the constant coefficient $C(i)$ with a depth z, which are denoted as $A(z)$, $B(z)$, and $C(z)$, respectively.

The inverted resistivity normalization module 4 is configured to perform 3D fine inversion of an electromagnetic data volume in the study area to obtain a distribution characteristic of an inverted resistivity $R_{inv}(x,y,z)$ at each point $P(x,y,z)$ in an underground space; and equally divide a profile of the inverted resistivity into M formations on a depth basis, and normalize the inverted resistivity in each formation to obtain a normalized inverted resistivity $R_{Ninv}(x,y,z)$ at different points in different formations.

The overburden pressure conversion module 5 is configured to invert a 3D density distribution $\rho_g(x,y,z)$ based on gravity observation data, and convert the density distribution into an overburden pressure distribution $Pre(x,y,z)$, where x denotes a horizontal distance of the point in the underground space, y denotes a longitudinal distance of the point in the underground space, and z denotes a vertical depth of the point in the underground space.

The geothermal temperature field distribution prediction module 6 is configured to obtain an accurate relationship characterization between the normalized inverted resistivity and the temperature at different points $P(x,y,z)$ in different formations in the deep formation of the study area, according to the pressure control coefficient $A(i)$, the temperature control coefficient $B(i)$, and the constant coefficient $C(i)$ in the constraint equation $F_{RTP}$ of the normalized resistivity-overburden pressure-temperature coupling relationship at different depths underground, the change relationships of the pressure control coefficient $A(i)$, the temperature control coefficient $B(i)$, and the constant coefficient $C(i)$ with the depth z, namely $A(z)$, $B(z)$, and $C(z)$, and the overburden pressure distribution $Pre(x,y,z)$; and predict a distribution characteristic of a deep geothermal field $T(x,y,z)$ in the study area according to the accurate relationship characterization and the normalized inverted resistivity $R_{Ninv}(x,y,z)$.

The embodiment of the present disclosure provides a method and device for predicting a deep geothermal field based on a temperature, pressure and resistivity coupling constraint. The present disclosure equally divides the logging resistivity-overburden pressure-temperature data of m boreholes in the study area or adjacent area into N formations on a depth basis and normalizes the resistivity in each formation. The present disclosure deduces the accurate relationship characterization $F_{RTP}(i)$ between the normalized resistivity, the temperature, and the pressure in different formations of different formations. The present disclosure inverses the electromagnetic data volume in the study area to obtain the resistivity distribution characteristic, equally divides the inverted resistivity into M formations, and normalizes the inverted resistivity into $R_{Ninv}(x,y,z)$. The present disclosure inverts the density distribution based on gravity observation data and converts the density distribution into the overburden pressure $Pre(x,y,z)$. The present disclosure calculates the distribution characteristic of the deep underground temperature field $T(x,y,z)$, formation by formation and point by point, based on the accurate relationship characterization $F_{RTP}$ of the different formations (depths), $R_{Ninv}(x,y,z)$, and $P_{pre}(x,y,z)$. The present disclosure can accurately convert the macroscopic resistivity characteristic of the underground medium into a visual temperature field distribution based on the overburden pressure constraint and achieves a wide and deep prediction range.

It should be noted that terms "including", "comprising" or any other variants thereof are intended to cover non-exclusive inclusions, such that a process, method, article, or system including a series of elements includes not only those elements, but also other elements not explicitly listed, or elements inherent to such a process, method, article or system. Without further limitation, an element qualified by the phrase "including a . . . " does not exclude the presence of an additional identical element in the process, method, article, or system including the element.

The serial numbers of the embodiments of the present disclosure are merely for description and do not represent a preference of the embodiments. In the unit claims where several apparatuses are listed, several of the apparatuses may be embodied by a same hardware item. The use of terms such as first, second, and third does not indicate any order, and can be interpreted as identification.

The above described are merely preferred embodiments of the present disclosure, which are not intended to limit the patent scope of the present disclosure. Any equivalent structure or equivalent process change made by using the specification and the drawings of the present disclosure, or direct or indirect application thereof m other related technical fields, should still fall in the protection scope of the patent of the present disclosure.

What is claimed is:

1. A method for predicting a deep geothermal field based on a temperature, pressure and resistivity coupling constraint, comprising the following steps:

acquiring a logging resistivity-density-temperature data combination of m boreholes located in a study area or an adjacent area; converting the density in the logging resistivity-density-temperature data combination into an overburden pressure, and constructing a logging resistivity-overburden pressure-temperature data combination; equally dividing the logging resistivity-overburden pressure-temperature data combination into N formations on a depth basis; and normalizing the logging resistivity in each formation of each well to obtain normalized logging resistivity-overburden pressure-temperature data sets of different formations;

constructing a constraint equation $F_{RTP}$ of a normalized resistivity-overburden pressure-temperature coupling relationship according to a plurality of the logging resistivity-overlying pressure-temperature data sets; and calculating a pressure control coefficient A(i), a temperature control coefficient B(i), and a constant coefficient C(i) in the constraint equation $F_{RTP}$ of the normalized resistivity-overburden pressure-temperature coupling relationship in different formations of different well locations, wherein i denotes an i-th formation;

combining values of the pressure control coefficient A(i), the temperature control coefficient B(i), and the constant coefficient C(i) in different formations of different well locations with depths of the corresponding formations to construct a target data set; and performing regression analysis on the target data set to obtain change relationships of the pressure control coefficient A(i), the temperature control coefficient B(i), and the constant coefficient C(i) with a depth z, the change relationships being denoted as A(z), B(z), and C(z), respectively;

performing three-dimensional (3D) fine inversion of an electromagnetic data volume in the study area to obtain a distribution characteristic of an inverted resistivity $R_{inv}(x,y,z)$ at each point P(x,y,z) in an underground space; equally dividing a profile of the inverted resistivity into M formations on a depth basis, and normalizing the inverted resistivity in each formation to obtain a normalized inverted resistivity $R_{Ninv}(x,y,z)$ at different points in different formations; and inverting a 3D density distribution $\rho_g(x,y,z)$ based on gravity observation data, and converting the density distribution into an overburden pressure distribution Pre(x,y,z), wherein x denotes a horizontal distance of the point in the underground space, y denotes a longitudinal distance of the point in the underground space, and z denotes a vertical depth of the point in the underground space;

obtaining an accurate relationship characterization between the normalized inverted resistivity and the temperature at different points P(x,y,z) in different formations in a deep formation of the study area according to the pressure control coefficient A(i), the temperature control coefficient B(i), and the constant coefficient C(i) in the constraint equation $F_{RTP}(i)$ of the normalized resistivity-overburden pressure-temperature coupling relationship at different depths underground, the change relationships of the pressure control coefficient A(i), the temperature control coefficient B(i), and the constant coefficient C(i) with the depth z, namely A(z), B(z), and C(z), and the overburden pressure distribution Pre(x,y,z);

predicting a distribution characteristic of a deep geothermal field T(x,y,z) in the study area according to the accurate relationship characterization and the normalized inverted resistivity $R_{Ninv}(x,y,z)$; and monitoring geothermal development temperature based on the predicted distribution characteristic of the deep geothermal field T(x,y,z) in the study area.

2. The method for predicting the deep geothermal field according to claim 1, wherein the step of converting in the logging the density resistivity-density-temperature data combination into the overburden pressure comprises: calculating the overburden pressure as follows:

$$P_{over}(h) = \begin{cases} 0, h = 0 \\ \sum_{i=1}^{N_P} \rho_{log}(h) g \Delta h, h > 0 \end{cases}$$

wherein $P_{over}(h)$ denotes the overburden pressure at different depths; $\rho_{log}$ denotes a formation logging density; g denotes an acceleration of gravity; h denotes a formation depth; $\Delta h$ denotes an interval of logging data; and $N_P$ denotes a number of logging data points from a depth h to the surface.

3. The method for predicting the deep geothermal field according to claim 1, wherein the step of equally dividing the logging resistivity-overburden pressure-temperature data combination into N formations on the depth basis; and normalizing the logging resistivity in each formation of each well to obtain the normalized logging resistivity-overburden pressure-temperature data sets of different formations comprises: normalizing the logging resistivity as follows:

$$R_{Norm}(i, j) = \frac{R_{log}(i, j)}{\max [R_{log}(i)]}$$

wherein each equal formation is expressed as $H_{range}(i)$:

$$H_{Lmin} + D_{Lseg} \times (i-1) \leq H_{range}(i) \leq H_{Lmin} + D_{Lseg} \times i$$

$$N = \text{round}\left(\frac{H_{Lmax} - H_{Lmin}}{D_{Lseg}}\right)$$

wherein $R_{Norm}(i,j)$ denotes the normalized logging resistivity at a j-th measuring point in the i-th formation of each well, i=1, 2, 3 ... N; $R_{log}(i,j)$ denotes the logging resistivity at the j-th measuring point in the i-th formation of each well; $R_{log}(i)$ denotes a logging resistivity data set of all measuring points in the i-th formation of each well; max $R_{log}$ denotes a maximum value of the logging resistivity data set of all the measuring points in the i-th formation of each well; $H_{Lmax}$ denotes a maximum logging depth of each well; $H_{Lmin}$ denotes a minimum logging depth of each well; $D_{Lseg}$ denotes a thickness of each equal formation; and $$\text{round}\left(\frac{H_{Lmax} - H_{Lmin}}{D_{Lseg}}\right)$$

denotes rounding of $$\frac{H_{Lmax} - H_{Lmin}}{D_{Lseg}}$$

to an integer.

4. The method for predicting the deep geothermal field according to claim 1, wherein the constraint equation $F_{RTP}(i)$ of the normalized resistivity-overburden pressure-temperature coupling relationship is expressed as follows $$F_{RTP}(i) = F(R_{Norm}(i), T_i, P_{iover}(i))$$

a coupling relationship among $R_{Norm}(i)$, $T_i$, and $P_{iover}$ is expressed as follows:

$$R_{Norm}(i) = A(i)\log\left(\frac{P_{over}(i)}{P_0}\right) + B(i)\log(T_i) + C(i))$$

wherein $F_{RTP}(i)$ denotes the constraint equation of the normalized resistivity-overburden pressure-temperature coupling relationship in the i-th formation, which is a function of $R_{Norm}(i)$, $T_i$, and $P_{iover}(i)$, and is expressed as $F(R_{Norm}(i), T_i, P_{iover}(i))$; $R_{Norm}(i)$ denotes a normalized resistivity data set of all measuring points in the i-th formation of each well; $P_0$ denotes a normal pressure; $P_{over}(i)$ denotes an overburden pressure data set of all the measuring points in the i-th formation of each well; and $T_i$ denotes a logging temperature data set of all the measuring points in the i-th formation of each well.

5. The method for predicting the deep geothermal field according to claim 1, wherein the step of normalizing the inverted resistivity in each formation to obtain the normalized inverted resistivity $R_{Ninv}(x,y,z)$ at different points in different formations comprises: normalizing the inverted resistivity as follows:

$$R_{Ninv}(k, x, y, z) = \frac{R_{inv}(k, x, y, z)}{\max[R_{inv}(k)]}$$

wherein x denotes a horizontal distance of each point in the underground space; y denotes a longitudinal distance of each point in the underground space; z denotes a vertical depth of each point in the underground space; $R_{inv}(k,x,y,z)$ denotes an inverted resistivity $R_{inv}(x,y,z)$ data set in a k-th formation, k=1,2,3, ... M; max $[R_{inv}(k)]$ denotes a maximum value of the inverted resistivity $R_{inv}(x,y,z)$ in the k-th formation; and $R_{Ninv}(k,x,y,z)$ denotes a normalized inverted resistivity $R_{Ninv}(x,y,z)$ data set in the k-th formation.

6. The method for predicting the deep geothermal field according to claim 1, wherein the step of inverting the 3D density distribution $\rho_g(x,y,z)$ based on the gravity observation data, and converting the density distribution into the overburden pressure distribution Pre(x,y,z) comprises: converting the density distribution into the overburden pressure distribution as follows:

$$P_{pre}(x, y, z) = \begin{cases} 0, z = 0 \\ \sum_{p_i=1}^{p_i=N_P} \rho_g(x, y, z)g\Delta z_{inv}, z > 0 \end{cases}$$

wherein $P_{pre}(x,y,z)$ denotes the overburden pressure distribution calculated based on an inversion of the 3D density distribution $\rho_g(x,y,z)$; $\rho_g(x,y,z)$ denotes the 3D density distribution inverted based on the gravity observation data; g denotes an acceleration of gravity; $\Delta z_{inv}$ denotes an interval of gravity inversion data along the depth z; and $N_P$ denotes a number of density inversion data points from the depth z to the surface.

7. The method for predicting the deep geothermal field according to claim 1, wherein the step of predicting the distribution characteristic of the deep geothermal field T(x, y,z) in the study area according to the accurate relationship characterization and the normalized inverted resistivity $R_{Ninv}(x,y,z)$ comprises: predicting the distribution characteristic of the deep geothermal field in the study area as follows:

$$T(x, y, z) = \exp\left[R_{Ninv}(x,y,z) - C_{cal} - A_{cal}\log\left(\frac{P_{pre}(x,y,z)}{P_0}\right)\right]/B_{cal}$$

$$A_{cal} = \begin{cases} A(i), z \in H_{range}(i), H_{Lmin} \le z \le H_{Lmax} \\ A(z = h), z > H_{Lmax} \text{ or } z < H_{Lmin} \end{cases}$$

$$B_{cal} = \begin{cases} B(i), z \in H_{range}(i), H_{Lmin} \le z \le H_{Lmax} \\ B(z = h), z > H_{Lmax} \text{ or } z < H_{Lmin} \end{cases}$$

$$C_{cal} = \begin{cases} C(i), z \in H_{range}(i), H_{Lmin} \le z \le H_{Lmax} \\ C(z = h), z > H_{Lmax} \text{ or } z < H_{Lmin} \end{cases}$$

wherein T(x,y,z) denotes a predicted temperature at each point; $A_{cal}$ denotes a pressure control coefficient used in calculating a deep temperature; $B_{cal}$ denotes a temperature control coefficient used in calculating the deep temperature; and $C_{cal}$ denotes a constant coefficient used in calculating the deep temperature.

8. A non-transitory computer readable storage medium for predicting a deep geothermal field based on a temperature, pressure and resistivity coupling constraint, comprising the following modules:
a data set acquisition module configured to: acquire a logging resistivity-density-temperature data combination of m boreholes located in a study area or an adjacent area; convert the density in the logging resistivity-density-temperature data combination into an overburden pressure, and construct a logging resistivity-overburden pressure-temperature data combination;

equally divide the logging resistivity-overburden pressure-temperature data combination into N formations on a depth basis; and normalize the logging resistivity in each formation of each well to obtain normalized logging resistivity-overburden pressure-temperature data sets of different formations;

a constraint equation construction and coefficient calculation module configured to: construct a constraint equation $F_{RTP}$ of a normalized resistivity-overburden pressure-temperature coupling relationship according to a plurality of the logging resistivity-overlying pressure-temperature data sets; and calculate a pressure control coefficient A(i), a temperature control coefficient B(i), and a constant coefficient C(i) in the constraint equation $F_{RTP}$ of the normalized resistivity-overburden pressure-temperature coupling relationship in different formations of different well locations, wherein i denotes an i-th formation;

a coefficient regression analysis module configured to: combine values of the pressure control coefficient A(i), the temperature control coefficient B(i), and the constant coefficient C(i) in different formations of different well locations with depths of the corresponding formations to construct a target data set; perform regression analysis on the target data set to obtain change relationships of the pressure control coefficient A(i), the temperature control coefficient B(i), and the constant coefficient C(i) with a depth z, the change relationships being denoted as A(z), B(z), and C(z), respectively;

an inverted resistivity normalization module configured to: perform 3D fine inversion of an electromagnetic data volume in the study area to obtain a distribution characteristic of an inverted resistivity $R_{inv}(x,y,z)$ at each point P(x,y,z) in an underground space; and equally divide a profile of the inverted resistivity into M formations on a depth basis, and normalize the inverted resistivity in each formation to obtain a normalized inverted resistivity $R_{Ninv}(x,y,z)$ at different points in different formations;

an overburden pressure conversion module configured to: invert a 3D density distribution $\rho_g(x,y,z)$ based on gravity observation data, and convert the density distribution into an overburden pressure distribution Pre(x,y,z), wherein x denotes a horizontal distance of the point in the underground space, y denotes a longitudinal distance of the point in the underground space, and z denotes a vertical depth of the point in the underground space;

a geothermal temperature field distribution prediction module configured to: obtain an accurate relationship characterization between the normalized inverted resistivity and the temperature at different points P(x,y,z) in different formations in a deep formation of the study area according to the pressure control coefficient A(i), the temperature control coefficient B(i), and the constant coefficient C(i) in the constraint equation $F_{RTP}(i)$ of the normalized resistivity-overburden pressure-temperature coupling relationship at different depths underground, the change relationships of the pressure control coefficient A(i), the temperature control coefficient B(i), and the constant coefficient C(i) with the depth z, namely A(z), B(z), and C(z), and the overburden pressure distribution Pre(x,y,z);

predict a distribution characteristic of a deep geothermal field T(x,y,z) in the study area according to the accurate relationship characterization and the normalized inverted resistivity $R_{Ninv}(x,y,z)$;

monitor geothermal development temperature based on the predicted distribution characteristic of the deep geothermal field T(x,y,z) in the study area.

\* \* \* \* \*